United States Patent [19]
Hill

[11] Patent Number: 4,978,845
[45] Date of Patent: Dec. 18, 1990

[54] CARD COUNTER WITH SELF-ADJUSTING CARD LOADING ASSEMBLY AND METHOD

[75] Inventor: James E. Hill, Wheeling, Ill.

[73] Assignee: Dynetics Engineering Corporation, Lincolnshire, Ill.

[21] Appl. No.: 413,865

[22] Filed: Sep. 28, 1989

[51] Int. Cl.[5] .................... G01V 9/02

[52] U.S. Cl. .................... 250/222.1

[58] Field of Search .......... 250/222.2, 222.1, 223 R, 250/224, 569; 377/53, 6, 7, 8, 30; 235/98 C, 483–484, 486; 271/149; 414/798.2, 798.9

[56] References Cited

U.S. PATENT DOCUMENTS

| | | | |
|---|---|---|---|
| 2,942,770 | 6/1960 | Eichorn | 206/449 X |
| 2,995,729 | 8/1961 | Steele | 364/200 |
| 3,627,116 | 12/1971 | Cooper | 206/45.33 |
| 3,665,164 | 5/1972 | Beveridge et al. | 235/61.11 E |
| 3,737,631 | 6/1973 | Harris | 235/61.6 R |
| 3,784,802 | 1/1974 | Imai et al. | 235/168 |
| 3,824,378 | 7/1974 | Johnson et al. | 377/39 |
| 3,854,035 | 12/1974 | Tyler et al. | 235/487 X |
| 3,944,794 | 3/1976 | Reehil et al. | 377/8 |
| 3,971,918 | 7/1976 | Saito | 377/53 |
| 4,017,830 | 4/1977 | Shigemori et al. | 377/8 |
| 4,180,204 | 12/1979 | Koenig et al. | 235/385 |
| 4,263,503 | 4/1981 | Bianco | 235/487 |
| 4,286,149 | 8/1981 | Ben-Nathan et al. | 377/53 |
| 4,298,790 | 11/1981 | Decker et al. | 377/53 |
| 4,419,734 | 12/1983 | Wolfson et al. | 364/567 |
| 4,481,667 | 11/1984 | Price et al. | 377/8 |
| 4,519,631 | 5/1985 | Stone et al. | 283/81 X |
| 4,549,750 | 10/1985 | Stone et al. | 283/79 |
| 4,563,739 | 1/1986 | Gerpheide et al. | 364/403 |
| 4,694,474 | 9/1987 | Dorman et al. | 377/30 |
| 4,704,517 | 3/1987 | Campisi et al. | 235/382 |
| 4,803,373 | 2/1989 | Imamura et al. | 250/223 R |
| 4,805,199 | 2/1989 | Muramatsu | 377/39 |
| 4,869,359 | 9/1989 | Muller et al. | 414/798.9 |

OTHER PUBLICATIONS

Dynetics Sales Brochure Entitled "The Series 5002 Credit Card Counter", published 9/85, 2 pages.

Dynetics Series 5002 Credit Card Counter Operating Manual, published Apr. 1, 1984, 3 pages.

Musashi Co., Ltd., "Tellac-50-PC Plastic Card Counter" Operation Manual, cover page and 9 pages, 1984.

Spartanics, Ltd., "Spartanics Model 65 stak-kounter" promotional brochure, 4 pages, printed 2/83.

*Primary Examiner*—David C. Nelms
*Assistant Examiner*—Michael Messinger
*Attorney, Agent, or Firm*—Potthast & Ring

[57] ABSTRACT

A credit card counter (40) with a self-adjusting card loading apparatus (42) having a card elevator plate (46) for elevating a rack of cards (14) to a position with the top edges (19) aligned with a sensor location (26) for optimal sensing. A spring (56) biases a pivot plate (52) to rotate in a direction to move the card elevator (46) until the top edges (18) abut a card guide member (50) aligned with the sensor location (26) which is located above the cards (14A) and out of path of debris carried by the rack of cards (14). The connection to the elevator plate (46) is by means of a pivot axle (72) and the sides of a slot (44A) in a base plate (44) have a snug fit with the sides of the elevator plate (46), so that relative movement is substantially translational. The elevator plate (44) is lowered sufficiently to allow the edges (18) under the guide member (50) and then permitted to rise to the correct position depending upon the height of the cards (14A).

24 Claims, 3 Drawing Sheets

CARD COUNTER WITH SELF-ADJUSTING CARD LOADING ASSEMBLY AND METHOD

BACKGROUND OF THE INVENTION

This invention relates to card counters and, more particularly, to a card counter card loading assembly which is self-adjustable for optimum sensing of stacks of cards of varying height.

The credit card counter 10 of the copending application Ser. No. 246,516, filed Sept. 19, 1988, for "Credit Card Counter and Method of Using Same" of the present inventor and assignee of this application, shown in FIGS. 1A and 1B, and of prior known units, are provided with a fixed card shelf 12 upon which a stack 14 of substantially identical cards 14A, such as plastic credit cards, is supported usually within a box 16 with the top edges 18 in vertical alignment beneath a sensor assembly 19 including an optical sensor 20, FIG. 1B, within a counter housing 22. The sensor 20 is focused through a cylindrical lens 24 at a focal point, or sensing location 26, which is a preselected distance beneath the sensor 20. Light from a source 28 passes through the lens 24, and is reflected off the edges 18 of the cards 14A in succession as the sensor 20 moves along a scan track extending across the back of the card shelf 12 in the direction of arrows 30 substantially transverse to the edges 18 of the cards and parallel to the front edge of the card shelf 12. The sensor 20 generates an electrical pulse for each light fluctuation which it "sees" whenever it passes the top edge 18 of a card 14A. These pulses are then electronically counted, stored, compared, displayed and otherwise used to maintain card inventory records. Reference should be made to the aforementioned U.S. patent application for further details.

This counter 10 works completely satisfactorily so long as the stack of cards 14 is at a precise standard height with the top edges 18 of the cards being precisely located at the sensing location and in focus by the optical sensor 20 for optimum sensing. However, when stacks of cards 14, usually in boxes 16, vary in height 32 such that the top edges 18 of the cards 14A are not located at the fixed focal point, the sensor does not "see" so well. As a result of blurred images of card edges 18, there are correspondingly indistinct electrical signals generated by the sensor instead of the strong pulses required for reliable detection. Accordingly, detection errors and thus counting errors can occur in those instances.

As cards, such as credit cards, debit cards, identification cards, key cards and the like have proliferated and become virtually ubiquitous in western society, the precise height standards to which they once conformed no longer prevail. This is due in part to variations in the boxes 16 in which they are usually stored and shipped as well as variations in the cards 14A themselves, such that it has become necessary to provide some means for adjustment for stacks of cards 14 of different heights. While the cards 14A are usually in boxes, this is not necessarily the case when counting cards. The phrase rack of cards 14 herein shall be used to mean the combination of the cards 14A and the box 16 in which they are contained, if in a box, and if not in a box, it shall be intended to mean the stack of cards, alone.

One known card counter employs a card loading system in which gravity is employed in part to insure that the edges of the cards are properly located at the sensor location 26; the box of cards is turned upside down, or upended, and partly lain directly on top of an alignment member which holds them in the correct position for optimum sensing. After counting the box of cards, the box is then turned right side up to a nonupended orientation, removed from the loading mechanism and replaced with another box. Some boxes are filled and covered with shrink wrap plastic or the like which prevents them from falling out of the box when turned over; however, other boxes are not covered and some are not full. For these other boxes, a mechanism is provided which has a blade enter the box and slide on a rod to tightly press all the cards against one end of the box to hold them in the box during optical alignment.

This known, self-adjusting card loader suffers from a number of disadvantages. First, since card alignment is with the top edges of the cards pointed downward, the photoptical sensor equipment including the scan mechanism which moves the sensor across the rack must be located directly beneath open boxes. Any chaff or other debris in or on the box, as well as loose cards, which fall, fall toward and possibly into contact with the optical equipment or the scan mechanism. Second, cards are capable of falling out of the boxes turned upside down if the blade pressure is insufficient; dropped cards can be lost or damaged or cause damage to the counter. Thirdly, the entire loading sequence is complicated by multiple steps which take a relatively long time simply to load, count and unload. The complication creates equipment maintenance problems, makes the counter difficult to operate and increases labor cost.

SUMMARY OF THE INVENTION

It is therefore the object of this invention to provide a card counter with a self-adjusting and loading assembly and method of using same which overcomes the disadvantages and limitations of the known card counters with nonadjusting loaders and the other known self-adjusting card loading mechanism; specifically, it is the objective to provide a loader and method in which loading and counting is achieved without turning the box of cards upside down, without provision of any complicated mechanism to prevent the cards from falling out of the loader and without sensing from beneath the cards in the path of falling card chaff, falling cards or other debris.

Instead, in the card counter of the present invention, proper alignment is achieved through means of only movement of the cards holding member which maintains a non-upended orientation of a rack of cards from a home position to the sensing location. Preferably, this is achieved by way of only relative, pure translational movement between the sensor and the cards without rotation and with the sensor being located above the cards and out of the path of falling debris. In this way, cards do not fall from the box; the mechanism is simplified, and the time required for a load-count-release cycle is significantly reduced.

Specifically, it is an objective to provide a self-adjusting card loading assembly for a card counter comprising a member for underlying support of a rack of cards to be counted, a member for mounting the sensor above the support member and means for causing the card support member and the sensor mounting member to move relatively closer together until the edges of any cards supported by the underlying support member are correctly positioned at a sensing location for optimum sensing. Preferably, the box of cards are supported on a substantially horizontal shelf which is spring loaded to automatically elevate it until the top edge of the cards are stopped by an alignment guide member at the head of the sensing, although other embodiments are envisioned.

Thus, it is also an object of the invention to position the edges of the cards at the sensing location for optimum sensing, comprising the steps of placing the rack of cards on an underlying support member and elevating the underlying card support member to a position at which the edges of the rack of cards are located at the sensing location. The height of the cards has no effect on the counting accuracy, for if another rack of cards is placed on the underlying support member having a different height than the previous rack of cards, the underlying card support member is moved to another position spaced from the position by the amount of the difference in height between two racks of cards and at which the edges of the other rack of cards are located at the sensing location.

Preferably, the cards support member is shelf like, and the cards are slid on and off between the forward edge of the shelf and a rearward portion on the shelf vertically beneath the scanning path of the sensor. The shelf, which is spring biased to move upwardly, is then released and allowed to rise until a card guide member engages the top edges of the card to block further upward movement and hold the top edges of the cards at the sensor location for optimal sensing.

BRIEF DESCRIPTION OF THE DRAWINGS

The aforementioned problems of the prior card counters are thereby overcome while complexity is reduced and efficiency of operation improved as will be made more apparent from a detailed description of the preferred embodiment of the credit card counter given with reference to the several figures of the drawings, in which.

DETAILED DESCRIPTION

Figure 1A:
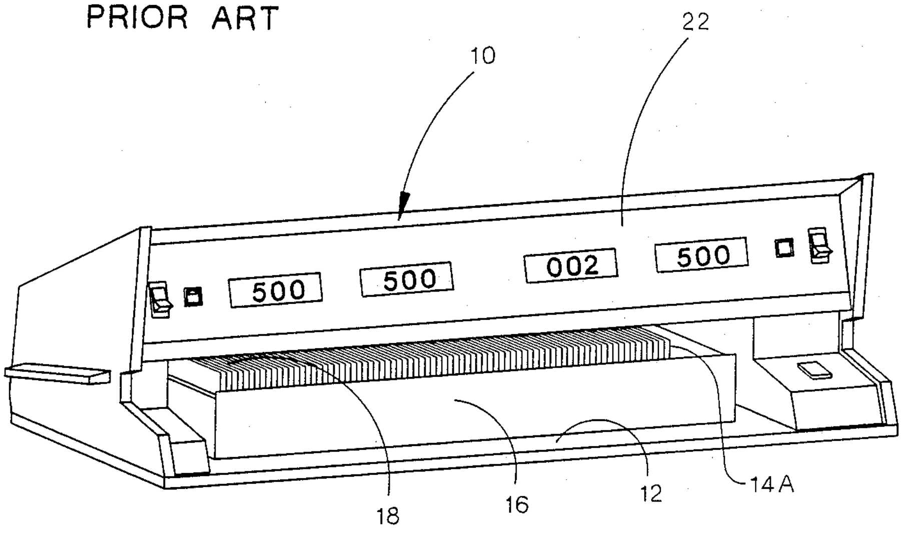
Fig.1A PRIOR ART
FIG. 1A is a prior art counter of the type with a fixed shelf for underlying support of a rack of cards beneath a photoptical scanning sensor, described above.
Figure 1B:
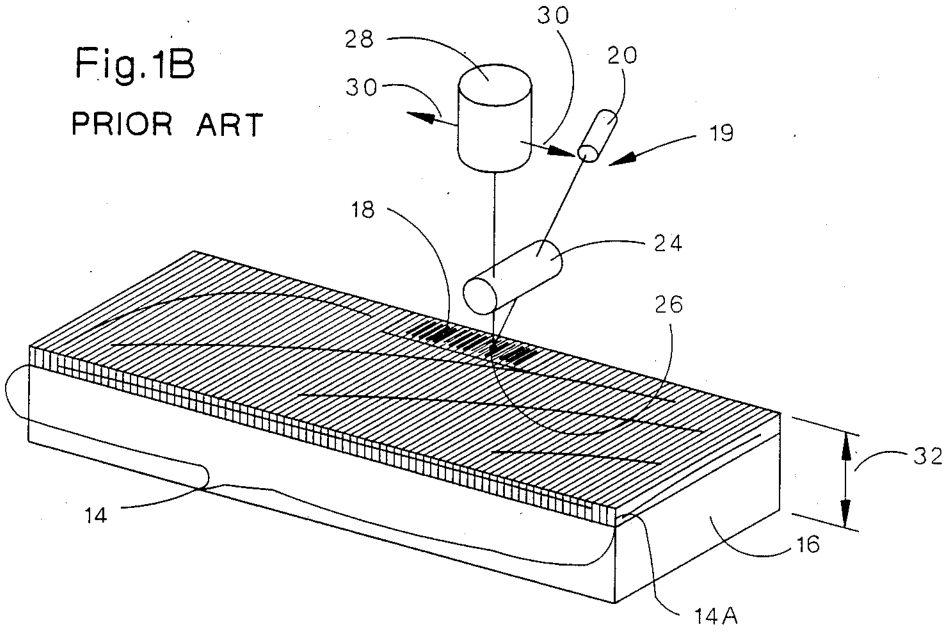
Fig.1B PRIOR ART
FIG. 1B is a photoptical sensor assembly of the prior art counter of FIG. 1A.
Figure 2A:
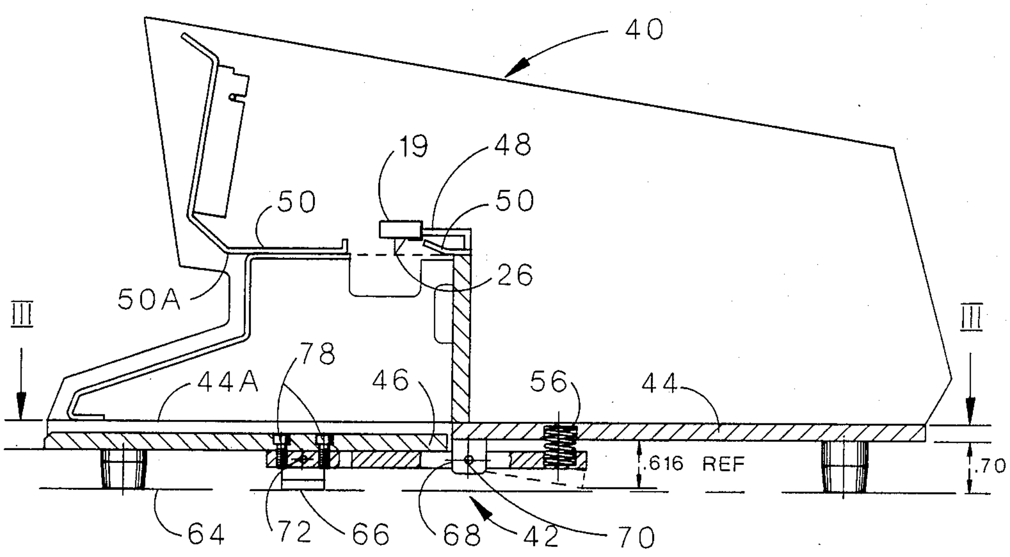
FIG. 2A is a simplified sectional side view of a card counter of the present invention in which the fixed card shelf 12 has been replaced by a self-adjusting card loading assembly, shown in a fully lowered position.
Figure 2B:
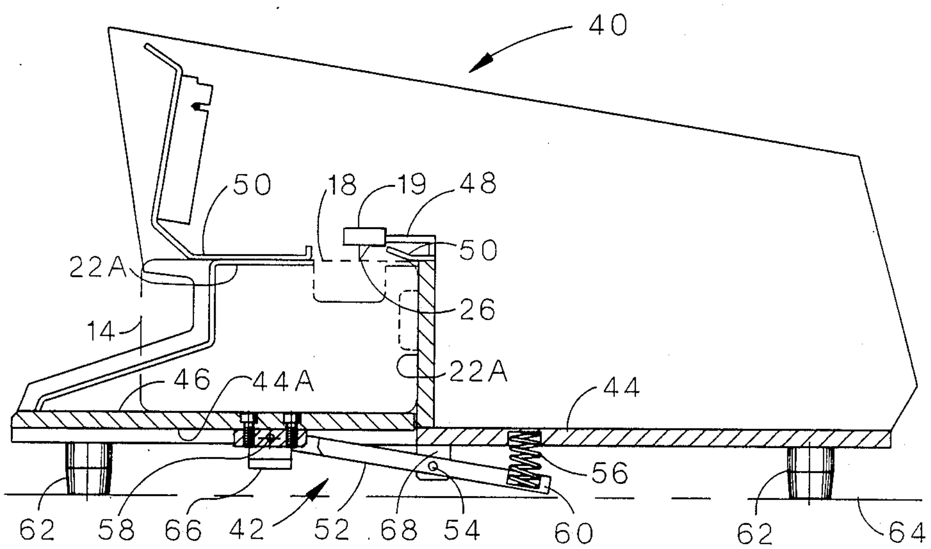
FIG. 2B is another simplified, sectional side view identical to that of FIG. 2A except with the self-adjusting card loading assembly shown in a fully elevated position with a rack of cards supported thereon standing free without a box.
Figure 3:
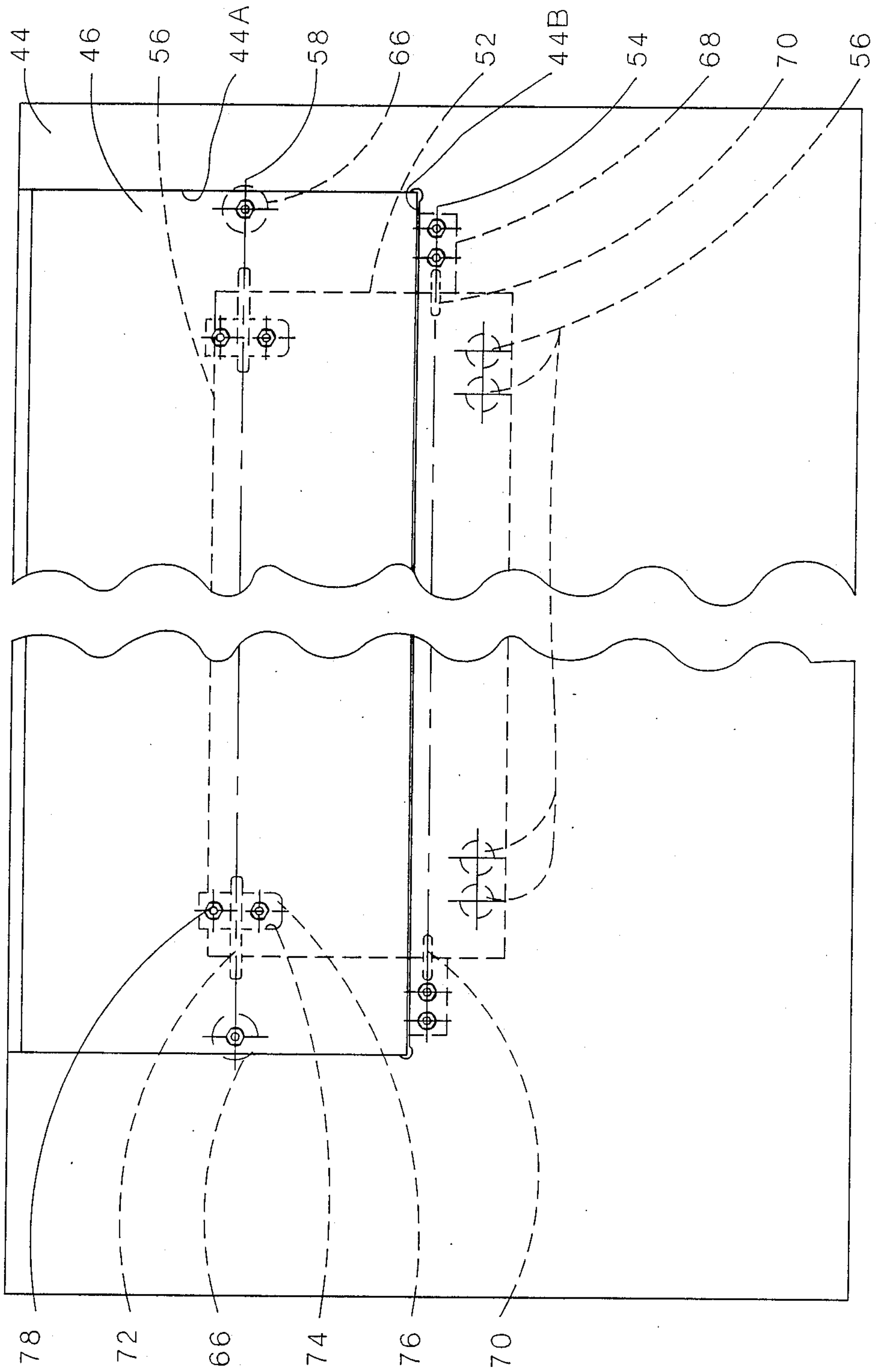
FIG. 3 is a top plan view of the self-adjusting card loading assembly taken along section line III-III of the card counter of FIG. 2A.

Referring now to FIGS. 2A and 2B and 3, the preferred embodiment of the card counter 40 of the present invention contains a self-adjusting card loading assembly 42 in place of the fixed card shelf of FIGS. 1A and 1B. In all other respects, the card counter 40 operates substantially the same and contains all the same elements as the card counter 10 of FIG. 1A including the sensor assembly of FIG. 1B.

In the preferred embodiment of the card counter 40, the self-adjusting card loading assembly 42 includes a C-shaped base plate, or base, 44; a card support member, or elevator plate 46; a sensor mounting member 48 (shown schematically) and means for automatically causing relative vertical movement between the elevator plate 46 and the base plate 44 until any rack of cards 14, shown in broken line in FIG. 2B in position for counting, has the top edges 18 aligned with the sensor location 26 for optimal sensing.

Preferably, the rack of cards 14 is elevated by elevator plate 46 until the top edges 18 abut a card guide member 50 aligned with the elevation of the sensor location 26 beneath the photosensor assembly 19. The photosensor assembly 19 perceives the cards 14 at an optimal resolving distance when the elevator plate 46 moves the cards 14 relatively closer to the photosensor assembly 19. The mechanism which raises the rack of cards to sensor location 26 includes a pivot plate 52 with an intermediate section pivotally connected for rotation about a substantially horizontal axis 54 extending substantially parallel to the direction 30 of the sensor scanning path, FIG. 1B, and located beneath the base plate 44. A distal end, or edge, 57, FIG. 3, is, likewise, connected to pivotally rotate about another axis 58 parallel to the axis 54 and located slightly beneath the elevator plate 46. An opposite, free end of pivot plate 52 is biased to rotate in a clockwise direction by means including four coil springs 56, FIG. 3. This same rack raising mechanism also restrains the elevator plate 46 against lateral movement.

This spring bias causes the free end 60 to move down which causes the distal end 57 to move upward to a resting position in which the elevator plate 46 is at a higher elevation needed to measure the lowest rack of cards 14 within the range contemplated for the loader 42. The base plate 44 rests on a set of legs 62 which support it above an underlying work table 64 at a preselected height. This height limits the maximum amount the end 60 can be lowered and thereby limits the maximum height to which the elevator plate 46 can be elevated. However, preferably the spring 56 is selected in size so that it is fully extended when the elevator plate reaches the position shown in FIG. 2B, so it causes it to move no further.

In normal use, it is contemplated that a sufficient downward force will be applied to the forward section of the elevator plate 46, which extends beyond the overhang 22A of the housing 22 containing the photosensor assembly 19, to lower it to a lower elevation than shown in FIG. 2B. The lowest elevation is reached when an up-down stop 66 carried at the underside of the elevator plate 46, reaches the level of legs 62 and engages the work table 64. This force will normally be the total of the weight of the rack of cards 14 plus an additional force applied through the rack of cards 14 by manually pressing down on the rack of cards 14 while it is slid across the elevator plate 46 until it abuts the rear housing wall 22A. Once the rack of cards 14 is in proper vertical alignment beneath the sensing location 26, the additional downward force is released to allow the springs 56 and pivot plate 52 to elevate the elevator plate 46 until further upward movement is blocked by engagement of the upper edges 18 engaging the card guide member 50. Alternatively, the downward force can be applied with one hand on the forward edge of the elevator plate 46 while the other hand of the operator is used to properly place the rack of cards in correct vertical alignment beneath the sensing location 26. Alternatively, the elevator plate 46 is only held down until the rearward edge of the rack of cards 14 is beneath the forward edge 50A of the guide member 50 and is then allowed to elevate the rack of cards 14 to the level of the guide member 50 before being placed in a position vertically aligned beneath the sensor location 26. While resiliently sandwiched between the guide member 50 and the underlying elevator plate 46, the rack is then slid into position.

Referring to FIG. 3, the elevator plate 46 is seen to have a snug fit along its sides with the sides 44A of a rectangular slot in the front of the base plate 44, while greater clearance is provided along a back edge 44B of the rectangular slot and at the back corners to reduce possible binding.

The rotation of pivot plate 52 about axis 54 is achieved by means of a pair of substantially identical pivot connection assembles each of which includes a block 68 secured to the underside of the base plate 44. The block 68 is secured by means of a pair of suitable threaded fasteners and which carries one end of an axle 70 aligned with axis 54. The other end of axle 70 fits into a suitable axle bearing in the side of the pivot plate 52.

The pivot axis 58 is likewise achieved by means of a pair of substantially identical pivotal end connection assemblies each including an axle 72 aligned with axis 58 and fitted across a slot 74 near the forward edge of pivot plate 52. A block 76 secured to the underside of elevator plate 46 by means of counter sunk, threaded fasteners 78 receives the axle 72 through a bearing hole therethrough.

Although the movement is theoretically pivotal, the relative length of the pivot plate 52, the relatively short distances of movement, the pivotal connection at axle 72 and the lateral restraint of the sides 44A of the slot in the base plate between which the sides of the elevator plate 46 are received, the actual movement of the elevator, plate 46 is substantially pure translation from the load home position, or lowest position, of the elevator plate 46 shown in FIG. 2A, to the maximum elevation, shown in FIG. 2B. The pivotal connection to the elevator plate 46 enables it to remain substantially horizontal regardless of its elevation. It is thus kept parallel to the scanning path which is necessary in order to keep the entire length of the rack of cards 14 at the proper level.

It should be appreciated that while the details of a preferred embodiment have been described, the scope of the invention as defined by the appended claims does not exclude any possible variations which are obvious from this disclosure or which are contemplated herein. For instance, although the cards are moved to the sensor location, it is also contemplated that the sensor could be lowered toward the shelf to achieve needed relative movement for correct optical alignment. It is also contemplated that the rack of cards could be counted while standing on edge, in which case gravity would keep them stacked against each other, while a guide would keep them aligned, and the relative movement to achieve optimum sensing would be in a horizontal instead of a vertical direction. Likewise, it is contemplated that movement could be achieved by means of a ferris wheel loading mechanism which successively moves a plurality of racks of cards past a single sensor for counting and then back to a home position for unloading. The object of the invention is achieved in its broadest sense if means and methods are provided which do not require the cards to be upturned and does not require the sensor located beneath the cards in the path of falling debris. Other types of sensors, such as magnetic sensors, could also be employed for cards which can be sensed in that way.

I claim:

1. In a card counter having a housing with an opening for receipt and removal of a rack of cards inserted therethrough in an insertion direction to a position beneath a sensing location and a sensor for detecting the edges of cards at the sensing location spaced beneath the sensor by a preselected distance and means responsive to the sensor by a preselected distance and means responsive to the sensor for counting detected cards, the improvement being a self-adjusting card loading assembly, comprising:

- a member for underlying support of a rack of cards loaded through the opening to be counted;
- a member for mounting the sensor above the support member for scanning lateral movement in a direction transverse to the preselected insertion direction; and
- means for causing the card support member and the sensor mounting member to move relatively closer to each other after loading in a vertical direction substantially transverse to that of the scanning lateral movement and the insertion direction until the edges of any cards supported by said underlying support member are correctly positioned at the sensing location for optimal sensing while concurrently restraining the rack support member against lateral movement.

2. The card counter of claim 1 in which said relative movement causing means includes means for raising the underlying support member form a position in which the cards are spaced from the sensing location to a position in which the cards are at the sensing location after the rack of cards has been loaded through said opening.

3. The card counter of claim 2 including

- a frame to which said housing is mounted with a base beneath said rack support member, and in which
- said sensor mounting member mounts the sensor to the frame with its sensing location at a fixed height above the base.

4. The card counter of claim 1 in which said preselected distance is a nonzero distance.

5. The card counter of claim 1 in which said sensor is a photoptical sensor having a focal distance equal to said preselected distance of the sensing location beneath the sensor.

6. The card counter of claim 1 in which said frame includes means for blocking further relative movement when the edges of the cards are correctly positioned at the sensing location for optimal sensing.

7. The card counter of claim 6 in which said blocking means includes a card guide member mounted to the frame and within the opening for engaging the edges of the cards to block further upward movement of the underlying support member when the edges of the cards are correctly positioned at the sensing location for optimum sensing.

8. The card counter of claim 6 in which said relative movement causing means includes a resilient member for biasing the support member for relative upward movement toward the sensor location.

9. The card counter of claim 1 in which said relative movement causing means includes a resilient member for biasing the support member and the mounting member for relative movement closer together.

10. The card counter of claim 9 in which said relative movement causing means includes a member for blocking further relative movement caused by the resilient member when the edge of the cards are at the sensing location for optimal sensing.

11. The card counter of claim 1 including a base in which said relative movement causing means includes a pivot arm having an intermediate section between a pair of opposite ends;

means for mounting the intermediate section to the base for pivotal movement relative thereto;

means for pivotally connecting one of the opposite ends underlying support member;

means connected with the base for biasing the other opposite end to move in a direction to pivot the intermediate section to raise the level of the one end and the underlying support member connected thereto.

12. The card counter of claim 11 in which said connecting means includes means for pivotally mounting said one end of the pivot arm to the underlying card support member.

13. The card counter of claim 11 including a stop, and a means for securing the stop to the underside of the card support member to block downward pivotal movement thereof beneath a substantially horizontal position.

14. The card counter of claim 11 in which said stop securing means includes means for securing the stop for limited up and down movement relative to the card support member.

15. In a card counter having a sensor for detecting the edges of a rack of cards when located at a sensing location and means for counting the detected cards, a method of positioning the edges of the cards at the sensing location for optimal sensing, comprising the steps of:

placing the rack of cards on an underlying stationary support member; and elevating the underlying card support member to a position at which the edges of the rack of cards are located at the sensing location.

16. The method of claim 15 including the step of holding the rack of cards still with the edges at said sensing location while the cards are detected and counted.

17. The method of claim 16 including the steps of removing the rack of cards from said position, placing another rack of cards on the underlying support member having a different height than said removed rack, and elevating the underlying card support member to another position spaced from the position by the amount equal to the difference in height and at which the edges of the other rack of cards are located at said sensing location.

18. The method of claim 17 in which said step of removing includes the steps of lowering the underlying support member, and sliding the rack of cards off the underlying support member.

19. The method of claim 15 in which said step of placing includes the steps of lowering the underlying support from a home elevation, and placing the rack of cards on the support while lowered and to a position substantially in vertical alignment with the sensor location before said step of elevating the underlying card support member to locate the edges at the sensing location.

20. The method of claim 19 in which said step of lowering includes the step of applying downward force on the underlying support member through means of the rack of cards.

21. In a card counter having a sensor for detecting the edges of a rack of cards when located at a sensing location spaced from the sensor by a preselected distance and means for counting the detected cards, the improvement being a self-adjusting card loading assembly, comprising:

a member for receiving at a load position and holding a box of cards in a nonupended orientation; and means for moving the cards holding member until the edges of the cards are at the sensing location through movement between the load position and sensing location while maintaining the nonupended orientation.

22. The card counter of claim 21 in which said cards holding member is a substantially horizontal member for underlying support of a box of cards lying on edge.

23. The card counter of claim 21 in which said moving means for said cards holding member only substantially translational movement between the home position and the sensing location.

24. The card counter of claim 23 in which said moving means moves said cards holding member in substantially only a vertical direction between the home position and the sensing location.

* * * * *

UNITED STATES PATENT AND TRADEMARK OFFICE

CERTIFICATE OF CORRECTION

PATENT NO. : 4,978,845

DATED : December 18, 1990

INVENTOR(S) : James E. Hill

It is certified that error appears in the above-identified patent and that said Letters Patent is hereby corrected as shown below:

Col. 6, lines 10 and 11, delete "by a preselected distance and means responsive to the sensor";

Col. 6, line 32, change "form" to - from -; and

Col. 7, line 14, after "ends" insert - to the -.

Signed and Sealed this

Fifteenth Day of September, 1992

*Attest:*

DOUGLAS B. COMER

*Attesting Officer* *Acting Commissioner of Patents and Trademarks*